(12) United States Patent
Ogawa et al.

(10) Patent No.: US 9,492,954 B2
(45) Date of Patent: Nov. 15, 2016

(54) METHOD OF MANUFACTURING PLATE-SHAPED BONDED BODY, BONDING DEVICE, AND PLATE-SHAPED BONDED BODY

(75) Inventors: Kouichi Ogawa, Tochigi (JP); Yoshihisa Shinya, Tochigi (JP); (Continued)

(73) Assignee: DEXERIALS CORPORATION, Tokyo (JP)

( * ) Notice: Subject to any disclaimer, the term of this patent is extended or adjusted under 35 U.S.C. 154(b) by 206 days.

(21) Appl. No.: 13/824,828

(22) PCT Filed: Dec. 19, 2011

(86) PCT No.: PCT/JP2011/079371
§ 371 (c)(1),
(2), (4) Date: Mar. 18, 2013

(87) PCT Pub. No.: WO2012/086591
PCT Pub. Date: Jun. 28, 2012

(65) Prior Publication Data
US 2013/0183530 A1  Jul. 18, 2013

(30) Foreign Application Priority Data

Dec. 22, 2010 (JP) .............................. 2010-285690

(51) Int. Cl.
*B32B 17/00* (2006.01)
*B32B 17/10* (2006.01)
(Continued)

(52) U.S. Cl.
CPC .............. *B29C 43/28* (2013.01); *B32B 7/12* (2013.01); *B32B 17/00* (2013.01); *B32B 37/003* (2013.01);
(Continued)

(58) Field of Classification Search
CPC ................ B32B 37/00; B32B 37/0007; B32B 37/003; B32B 37/12; B32B 37/1243;
(Continued)

(56) References Cited

U.S. PATENT DOCUMENTS

| 3,075,870 A | 1/1963 | Hedler et al. |
| 2004/0016506 A1 | 1/2004 | Sakayori et al. |

(Continued)

FOREIGN PATENT DOCUMENTS

| JP | A-2003-186011 | 7/2003 | |
| JP | 2004296139 A | * 10/2004 | ............. H05B 33/10 |

(Continued)

OTHER PUBLICATIONS

Mar. 6, 2012 International Search Report issued in International Application No. PCT/JP2011/079371.

(Continued)

*Primary Examiner* — Philip Tucker
*Assistant Examiner* — Brian R Slawski
(74) *Attorney, Agent, or Firm* — Oliff PLC (57) ABSTRACT

A method for quickly applying and spreading adhesive between substrates without leaving air bubbles. The method includes holding two substrates apart from each other with adhesive sides facing, a second substrate being positioned above a first substrate. The second substrate is suspended in a manner so as to cause a portion to warp towards the first substrate. After a liquid filler is applied between the two substrates, rollers are lowered onto the second substrate and moved so as to disperse the liquid filler between the first and second substrates. In accordance with the rolling of the rollers, end portions of the second substrate are lowered towards the first substrate.

7 Claims, 6 Drawing Sheets

(75) Inventors: Tomoyuki Toyoda, Tochigi (JP);
Yasumi Endo, Tochigi (JP)

(51) Int. Cl.

| | |
|---|---|
| *C03C 27/00* | (2006.01) |
| *G02C 7/00* | (2006.01) |
| *A61F 13/15* | (2006.01) |
| *B29C 65/00* | (2006.01) |
| *B32B 37/00* | (2006.01) |
| *B29C 65/48* | (2006.01) |
| *C09K 19/00* | (2006.01) |
| *B21D 51/44* | (2006.01) |
| *B28B 3/00* | (2006.01) |
| *B28B 7/26* | (2006.01) |
| *B28B 21/82* | (2006.01) |
| *B30B 9/28* | (2006.01) |
| *B29C 43/28* | (2006.01) |
| *B32B 37/12* | (2006.01) |
| *B32B 7/12* | (2006.01) |
| *G02F 1/1333* | (2006.01) |
| *B32B 38/18* | (2006.01) |

(52) U.S. Cl.
CPC ..... *B32B 37/1284* (2013.01); *G02F 1/133308* (2013.01); *B32B 38/1866* (2013.01); *B32B 2457/202* (2013.01); *G02F 2001/133331* (2013.01)

(58) Field of Classification Search
CPC ............. B32B 37/10; B32B 37/1284; B32B 37/1292; B32B 38/18; B32B 38/1866; B32B 2310/0831; G02F 2001/133331; G02F 2001/133308; G02F 1/1303; G02F 1/1333; G02F 1/1341; G02F 2202/28; B29C 66/41; B29C 66/45; B29C 66/342; B29C 66/345; B29C 65/48; B29C 65/483; B29C 65/4845
USPC .......... 156/60, 99, 100, 104, 160, 163, 295; 264/239, 241, 259, 1.1; 425/500, 518; 445/24, 25
See application file for complete search history.

(56) References Cited

U.S. PATENT DOCUMENTS

| | | |
|---|---|---|
| 2009/0215351 A1 | 8/2009 | Kobayashi et al. |
| 2009/0283211 A1* | 11/2009 | Matsuhira ................. 156/275.7 |
| 2010/0265195 A1 | 10/2010 | Watanabe |
| 2011/0168328 A1* | 7/2011 | Schaper et al. ............... 156/305 |

FOREIGN PATENT DOCUMENTS

| | | | |
|---|---|---|---|
| JP | 2006-138897 A | 6/2006 | |
| JP | A-2009-180911 | 8/2009 | |
| JP | A-2009-198755 | 9/2009 | |
| WO | WO 2007/063751 A1 | 6/2007 | |
| WO | WO 2009/078195 A1 | 6/2009 | |
| WO | WO 2009158474 A2 * | 12/2009 | ............. G02F 1/133 |

OTHER PUBLICATIONS

Mar. 7, 2016 Search Report issued in European Application No. 11851748.1.

* cited by examiner

METHOD OF MANUFACTURING PLATE-SHAPED BONDED BODY, BONDING DEVICE, AND PLATE-SHAPED BONDED BODY

FIELD OF THE INVENTION

This invention relates to a method of manufacturing a plate-shaped bonded body obtained by bonding plate-shaped bodies, a bonding device for a plate-shaped body and a plate-shaped bonded body manufactured by using the device, and the invention can be suitably used particularly for a plate-shaped bonded body that is manufactured by filling a filler between large-sized plate-shaped bodies.

The present application asserts priority rights based on JP Patent Application 2010-285690 filed in Japan on Dec. 22, 2010. The total contents of disclosure of the Patent Application of the senior filing date are to be incorporated by reference into the present Application.

BACKGROUND OF THE INVENTION

Conventionally, liquid crystal display panels have been increasing employed as image display devices for use in televisions, personal computers, personal digital assistants or cellular phones. Among these, a liquid crystal display device obtained by bonding a cover glass and a liquid crystal display panel using a transparent resin having a refractive index equivalent to that of the cover glass is advantageous in view of picture qualities such as contrast, color or clearness and in view of shock resistance of the liquid crystal display panel.

In a liquid crystal panel device of this kind, mixture of air bubbles when filling the transparent resin between the cover glass and the liquid crystal display panel will result in bright points at the time of incidence of light which remarkably degrades the picture qualities so that it is required to perform bonding without leaving any air bubbles between the substrates.

Figure 8A:
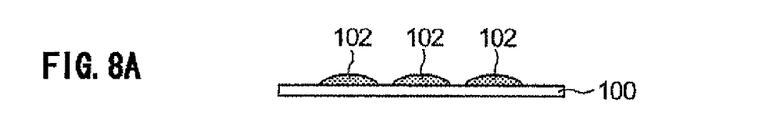
FIG. 8A to FIG. 8D are side views showing steps of bonding substrates according to an inversion method.
Figure 8B:
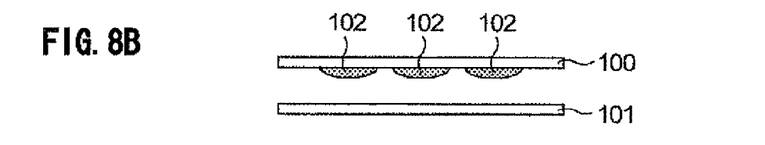
Figure 8C:
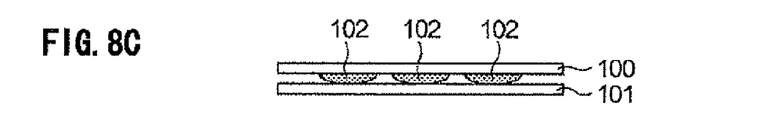
Figure 8D:
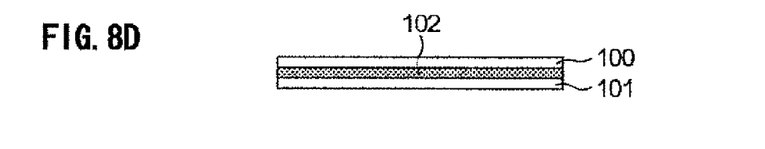

A generally known method for bonding two substrates such as a liquid crystal display panel and a cover glass using liquid transparent resin is the so-called inversion method. In the inversion method, as shown in FIG. 8, a liquid adhesive 102 is applied onto an adhesive surface of one substrate 100 of a pair of substrates 100, 101 to be bonded (FIG. 8A) and the substrate 100 is inversed to make the surface applied with the adhesive oppose an adhesive surface of the other substrate 101 (FIG. 8B). By approximate and pressure joining the substrates 100, 101 (FIG. 8C), the adhesive 102 is made to fit and spread between the substrates 100, 101 (FIG. 8D).

However, since the substrate applied with the liquid adhesive is inversed in the inversion method, it might by that dipping of the adhesive might cause scattering of the adhesive at the time of inversion or the like and that the adhesive adheres to spots other than the specified positions. Air bubbles are accordingly mixed at the time of adhering the substrates 100, 101, and such air bubbles will remain since it is impossible to fit and spread the adhesive between the substrates 100, 101 while eliminating the air bubbles. Moreover, the inversion method requires a larger-sized manufacturing facility the larger the size of the substrates to be adhered becomes which will lead to increased manufacturing costs.

Figure 9A:
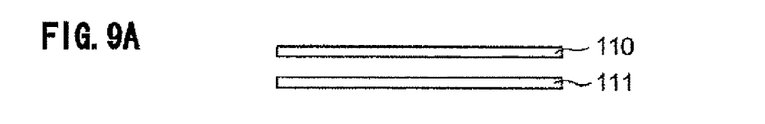
FIG. 9A to FIG. 9D are side views showing steps of bonding substrates according to a gap dispense method.
Figure 9B:
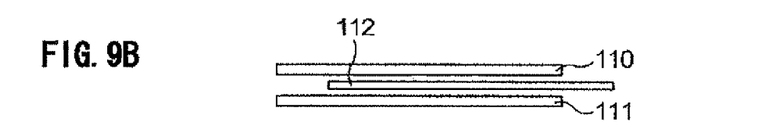
Figure 9C:
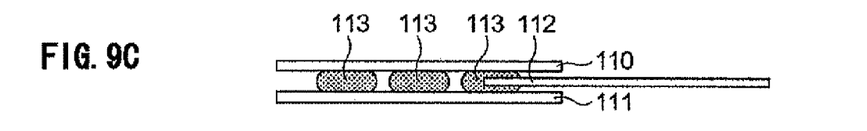
Figure 9D:
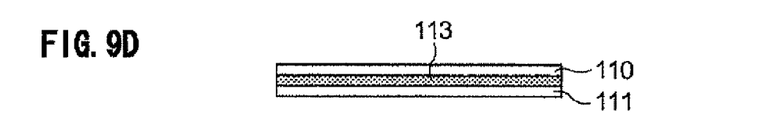

Further, the so-called gap dispense method is a known bonding method of disk substrates such as DVDs. In the gap dispense method, as shown in FIG. 9, each of a pair of substrates 110, 111 to be bonded is held to face each other at a specified clearance (FIG. 9A) and a dispensing nozzle 112 is inserted between the substrates 110, 111 (FIG. 9B). An adhesive 113 is then injected from the dispensing nozzle 112 between both substrates while contacting these substrates (FIG. 9C) whereupon the adhesive 113 is dispersed over the entire clearance between both substrates by rotating both substrates 110, 111 (FIG. 9D).

According to this gap dispense method, it is possible to effectively prevent mixing of air bubbles at the time of bonding the substrates by supplying the adhesive 113 while making the adhesive contact the adhesive surfaces of both substrates that are held to face each other. Moreover, the gap dispense method is capable of dispersing, after injection of the adhesive, the adhesive over the entire surfaces of both substrates due to rotation of the substrates, of shaking off excess adhesive to the periphery, and of eliminating air bubbles.

However, when the gap dispense method is applied to bonding of large-sized substrates, the adhesive will not be dispersed through rotation but the adhesive will be fit and spread over the entire substrates by approximate the substrates since large-sized substrates have large adhesive areas and are of rectangular shape. Accordingly, the time required for fitting and spreading the adhesive will become longer accompanying the increase in size of the substrates which leads to a longer cycle time.

When a pattern for applying the adhesive by the dispensing nozzle is set to cover a wide area in order to shorten the time required for fitting and spreading, it might happen that an obstruction area is formed by the adhesive, leaving air bubbles. There are many restrictions for drawing patterns of adhesive for preventing occurrence of such obstruction areas so that the adhesive cannot be applied over a wide area of the substrates which consequently makes it difficult to shorten the time required for fitting and spreading.

PRIOR-ART DOCUMENTS

Patent Document

PTL 1: Japanese Patent Application Laid-Open No. 2003-186011

SUMMARY OF THE INVENTION

It is accordingly an object of the present invention to provide a method of manufacturing a plate-shaped bonded body, a bonding device and a plate-shaped bonded body with which it is possible to fit and spread adhesive in a short time for bonding the substrates without leaving air bubbles.

For solving the above-mentioned subject, the method of manufacturing a plate-shaped bonded body according to the present invention includes a holding step in which respective adhesive surfaces of a first substrate and a second substrate are made to face each other and in which the adhesive surface of the second substrate is held on the first substrate while making the adhesive surface of the second substrate warp towards the first substrate side: a discharging step in which a dispensing nozzle is inserted into a most approximate position of the first substrate and the second substrate and in which a liquid filler is discharged from the dispensing nozzle to adhere to the first substrate and the second substrate; and a filling step in which pressing members are disposed on the second substrate at a position corresponding to the most approximate position and in which the liquid filler is fit and spread between the first and second substrates by making the pressing members move on the second substrate, wherein the second substrate is held in parallel to the first substrate in correspondence with moving positions of the pressing member.

The bonding device according to the present invention comprises a mounting portion on which a first substrate is mounted, a supporting portion for holding end portions of a second substrate that is made to face the first substrate and for supporting the second substrate above the first substrate while warping a main surface of the second substrate towards the first substrate side, a dispenser nozzle that is inserted into a most approximate position between the first substrate mounted on the mounting portion and the second substrate supported by the supporting portion for discharging a liquid filler over a range extending between the first substrate and the second substrate, and pressing members that are disposed on the second substrate at a position corresponding to the most approximate position for fitting and spreading the liquid filler between the first and second substrates by moving on the second substrate, wherein the second substrate is held in parallel to the first substrate in correspondence with moving positions of the pressing members.

The plate-shaped bonded body according to the present invention is manufactured by using the above method of manufacturing a plate-shaped bonded body.

Effects of Invention

According to the present invention, by injecting a liquid filler at a most approximate position between a first substrate and a second substrate, the liquid filler is made to adhere on both of the surfaces of the first substrate and second surface and the liquid filler is fit and spread from this position by means of laminating rollers. According to this invention, since end portions of the second substrate are held in parallel to the first substrate in accordance with rolling movements of the laminating rollers at this time, no air bubbles will mix into the liquid filler and since the liquid filler is fit and spread in accordance with rolling movements of the laminating rollers, it is possible to perform filling over the entire surfaces in a short time even if the first substrate and the second substrate are of large sizes.

BRIEF DESCRIPTION OF DRAWINGS

FIG. 4 is a view showing a dispenser nozzle, wherein

FIG. 6 is a side view showing manufacturing steps of a plate-shaped bonded body, wherein

FIG. 7 is a perspective view showing manufacturing steps of a plate-shaped bonded body, wherein

DETAILED DESCRIPTION OF THE INVENTION

The method of manufacturing a plate-shaped bonded body, the bonding device and the plate-shaped bonded body to which the present invention is applied will now be explained in details while referring to the drawings. The present bonding device 1 for a plate-shaped body is used for manufacturing a liquid crystal display panel for use as a large-sized TV monitor or the like in which a cover glass is bonded onto a display surface using transparent resin.

<Plate-Shaped Bonded Body 2>

Figure 1:
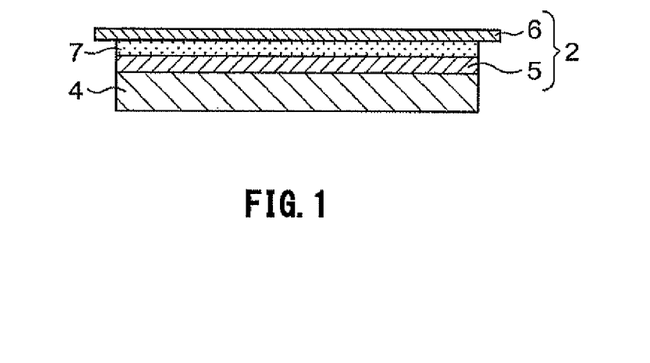
FIG. 1 is a sectional view showing a plate-shaped bonded body in which a polarizing plate and a cover glass are bonded by means of a transparent resin.

A plate-shaped bonded body 2 is suitable for use as a large-sized TV monitors having a size larger than, for instance, 32 inches, but it is also applicable for smaller sizes. In the present embodiment, explanations will be made as one example about a plate-shaped bonded body 2 as shown in FIG. 1 in which a cover glass 6 made of a tempered glass plate having a diagonal dimension of 40 inches and a thickness of 0.7 mm is bonded onto a polarizing plate 5 having a diagonal dimension of 40 inches that is provided on a display surface of a liquid crystal display panel 4 comprised of a liquid crystal layer and oriented film and others by using a transparent resin 7 having a refractive index equivalent to that of the cover glass 6.

The transparent resin 7 is, for instance, a transparent ultraviolet curing type elastic resin with a refractive index that is controlled to restrict scattering of light such that the visibility of the liquid crystal panel 2 is not harmed even when the resin is filled between the polarizing plate 5 and the cover glass 6.

The viscosity of the transparent resin 7 is selected to be in a range of, for example, 700 mPa·s to 5000 mPa·s which is a viscosity with which the resin can be filled while adhering simultaneously to the polarizing plate 5 and the cover glass 6 and with which a condition in which the resin adheres to the polarizing plate 5 and the cover glass 6 held at a specified clearance can be maintained. In accordance with such a viscosity of the transparent resin 7, a clearance dimension of the polarizing plate 5 and the cover glass 6 is set to be in a range of 3.5 mm to 10 mm. More particularly, in the present embodiment, a transparent elastic resin of ultraviolet curing type having a viscosity of 3500 mPa·s is used as the transparent resin 7 and, as it will be described later, the clearance of a position at which the polarizing plate 5 and the cover glass 6 are most approximate is maintained to be 5.5 mm whereupon the transparent resin 7 is injected to this position.

According to this plate-shaped bonded body 2, by bonding the polarizing plate 5 and the cover glass 6 by means of the transparent resin 7, it is possible to achieve improvements in picture qualities such as contrast, color and clearness and to improve the shock resistance of the liquid crystal display panel.

<Bonding Device 1>

Figure 2:
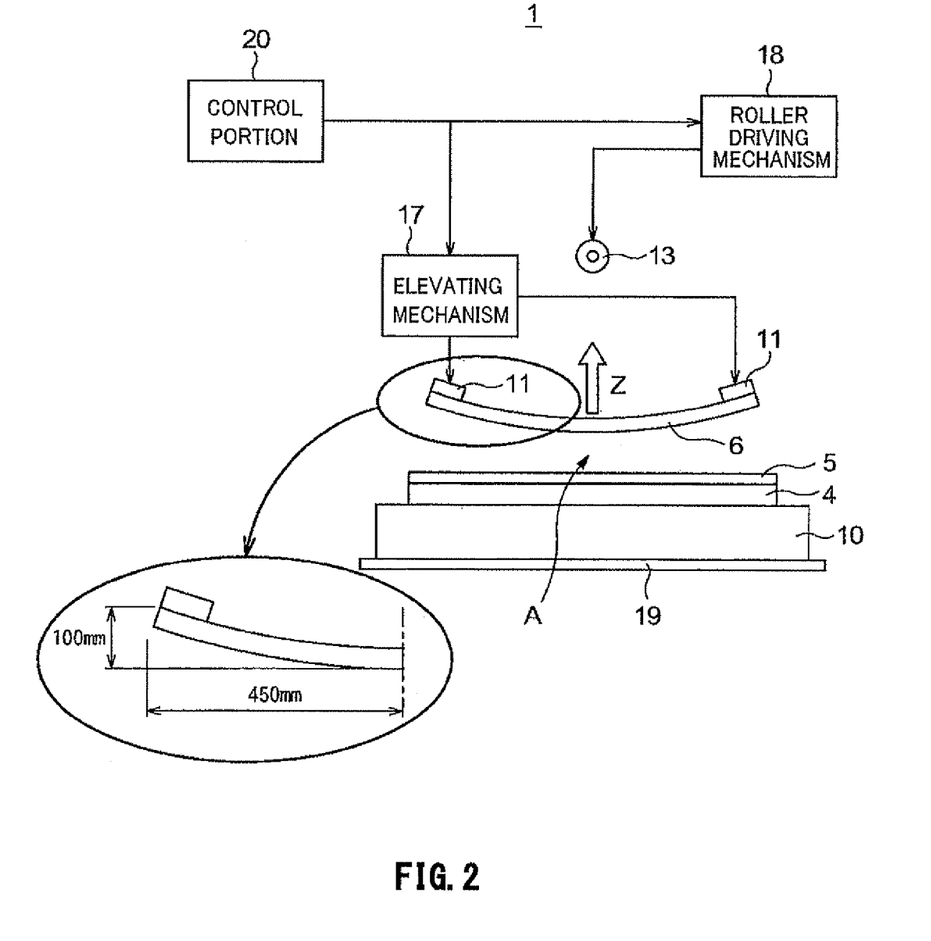
FIG. 2 is a side view showing a bonding device for a plate-shaped bonded body from one side.
Figure 3:
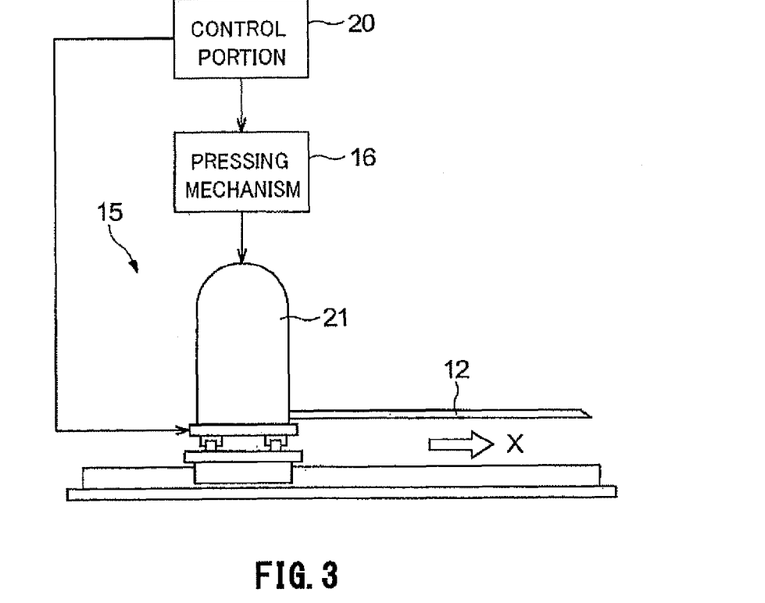
FIG. 3 is a side view showing the bonding device for a plate-shaped bonded body from the other side.

A bonding device 1 for bonding the polarizing plate 5 and the cover glass 6 by means of the transparent resin 7 comprises, as shown in FIG. 2 and FIG. 3, a mounting portion 10 on which the polarizing plate 5 is mounted, a cover glass supporting portion 11 for supporting the cover glass 6 while making the cover glass face the polarizing plate 5 that is supported by the mounting portion 10, a dispensing nozzle 12 for injecting the transparent resin 7 between the polarizing plate 5 and the cover glass 6 that are held to face each other by means of the mounting portion 10 and the cover glass supporting portion 11, and laminating rollers 13 that are rolled on the cover glass 6 to make the transparent resin 7 fit and spread between the polarizing plate 5 and the cover glass 6.

The bonding device 1 further comprises a nozzle moving mechanism 15 for moving the dispensing nozzle 12, a pressing mechanism 16 for making the transparent resin 7 be discharged from a discharge outlet 22 of the dispensing nozzle 12, an elevating mechanism 17 for elevating the cover glass supporting portion 11, a roller driving mechanism 18 for driving the laminating rollers 13, and a control portion 20 for controlling these mechanisms 15 to 18, all of which are arranged on a table 19.

<Mounting Portion/Supporting Portion>

The mounting portion 10 on which the polarizing plate 5 is mounted is fixed on the table 19 and the polarizing plate 5 is held to face vertically upward such that its adhesive surface faces the cover glass 6 by means of vacuum holding or the like.

The cover glass supporting portion 11 for supporting the cover glass 6 holds the cover glass 6 such that its adhesive surface at which it adheres to the polarizing plate 5 faces upward by engaging outer peripheral edges of the cover glass 6 or by means of a holding means such as vacuum holding or the like. With this arrangement, a central portion of the cover glass 6 in the longitudinal direction is warped towards the polarization plate 5 over a width direction so that a curve top portion of the cover glass 6 becomes a most approximate position A with the polarizing plate 5.

The most approximate position A has a clearance at which the transparent resin 7 having a specified viscosity adheres to the polarizing plate 5 and the curve top portion of the cover glass 6 at the most approximate position A upon inserting the dispensing nozzle 12 (to be described later) and injecting the transparent resin 7. For instance, when the viscosity of the transparent resin 7 is 3500 mPa·s, the clearance at the most approximate position A is set to be 5.5 mm. Further, at the most approximate position A, the laminating rollers 13 descend and roll in a longitudinal direction of the cover glass 6 such that transparent resin 7 is dispersed while adhering to the polarizing plate 5 and the cover glass 6.

The cover glass supporting portion 11 is supported above the mounting portion 10 to be elevating by means of the elevating mechanism 17. The elevating mechanism 17 is comprised of a power means such as an actuator and elevates the cover glass supporting mechanism 11 in vertical directions which is a direction in the arrow Z or a direction against the arrow Z in FIG. 2.

The elevating mechanism 17 elevates the cover glass supporting portion 11 when the polarizing plate 5 or the cover glass 6 is supported by the mounting portion 10 or the cover glass supporting portion 11. When injecting the transparent resin 7 between the polarizing plate 5 and the cover glass 6 for bonding, the elevating mechanism 17 descends the cover glass supporting portion 11 so that the cover glass 6 approximates the polarizing plate 5 and holds the polarizing plate 5 and the cover glass 6 at a specified clearance through which the dispensing nozzle 12 can be inserted and the transparent resin 7 can be applied while contacting the polarizing plate 5 and the cover glass 6. After filling the transparent resin 7, the elevating mechanism 17 further descends the cover glass supporting portion 11 in accordance with the rolling of the laminating rollers 13 (to be described later) and holds the cover glass 6 in parallel to the polarizing plate 5 so as to expand the transparent resin 7 over the entire surfaces of the polarizing plate 5 and the cover glass 6 without mixing air bubbles therein.

<Dispensing Nozzle/Nozzle Moving Mechanism>

The dispensing nozzle 12 for discharging the transparent resin 7 between the polarizing plate 5 and the cover glass 6 has a cylindrical body that is supported in parallel to a main surface of the polarizing plate 5 held by the mounting portion 10. The dispensing nozzle 12 is further connected to a pressurizing means 21 such as a syringe or tank for supplying the transparent resin 7. The dispensing nozzle 12 is supported by the nozzle moving mechanism 15 at a height at which it is movable back and forth through the clearance between both substrates along the most approximate position A of the polarizing plate 5 and the cover glass 6 without contacting both substrates. The dispensing nozzle 12 moves in a direction against the arrow X in FIG. 3, in a direction of arrow Z in FIG. 2 and in a direction that is orthogonal to the sheet for drawing a specified discharge pattern by the transparent resin 7 along the most approximate portion A within the clearance between the polarizing plate 5 and the cover glass 6.

Figure 4A:
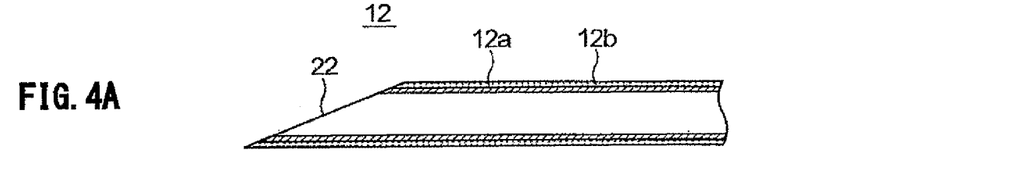
FIG. 4A is a sectional view.
Figure 4B:
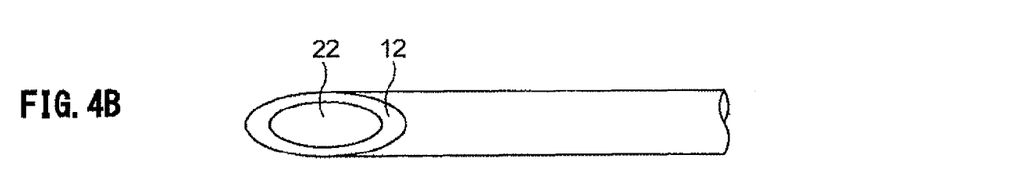
FIG. 4B is a plan view.

As shown in FIG. 4, the dispensing nozzle 12 is comprised of a nozzle main body 12a made of metal or industrial plastic and a soft resin layer 12b for coating the nozzle main body 12a so as not to damage the polarizing plate 5 and the cover glass 6. The resin layer 12b is formed by, for instance, baking finishing resin exhibiting superior low frictional, wear-resistant, water-repellent and corrosion-resistant characteristics such as fluorine resin onto the surface of the nozzle main body 12a. It should be noted that the dispensing nozzle 12 is not limited to one having a circular sectional shape and it might also have a flat circular or rectangular shape.

There is no fear that the dispensing nozzle 12 damages the polarizing plate 5 and the cover glass 6 even if the nozzle comes into sliding contact with the polarizing plate 5 and the cover glass 6 due to the formation of the resin layer 12*b* when the nozzle discharges the transparent resin 7 while moving through the clearance between the polarizing plate 5 and the cover glass 6. More particularly, the discharge nozzle is formed of metal or industrial plastic and applies the transparent resin 7 while moving through the clearance between the polarizing plate 5 and the cover glass 6 along the most approximate position A by means of the nozzle moving mechanism 15. At this time, the dispensing nozzle 12 is moved so as not to abut the polarizing plate 5 and the cover glass 6; however, even if the nozzle abuts the polarizing plate 5 and the cover glass 6 due to oscillation or warping, there is no fear that the polarizing plate 5 and the cover glass 6 are damaged since the nozzle is coated by the resin layer 12*b*.

Further, the provision of the resin layer 12*b* that exhibits superior water-repelling and corrosion-resistant properties for the dispensing nozzle 12 also prevents so-called dripping in which the transparent resin 7 drips from the discharge outlet 22 even after termination of discharge. The dispensing nozzle 12 is accordingly capable of applying transparent resin 7 to only specified portions while preventing conditions in which the transparent resin 7 is adhered to unexpected portions.

Moreover, since the dispensing nozzle 12 can prevent damages caused through contact with the polarizing plate 5 and the cover glass 6, it is possible to apply the transparent resin 7 without reducing the moving speed by the nozzle moving mechanism 15. Accordingly, the time during which the transparent resin 7 discharged at an earlier time and the transparent resin 7 discharged at a later time is exposed to air will not differ largely and no differences in filling characteristics or curing characteristics will be caused. While it is desirable to finish application of the transparent resin 7 quickly without reducing the nozzle moving speed while the time required for the application step of the transparent resin 7 increases the larger the substrate becomes, the bonding device 1 is advantageously capable of applying the transparent resin 7 without reducing the moving speed of the nozzle moving mechanism 15.

Figure 4C:
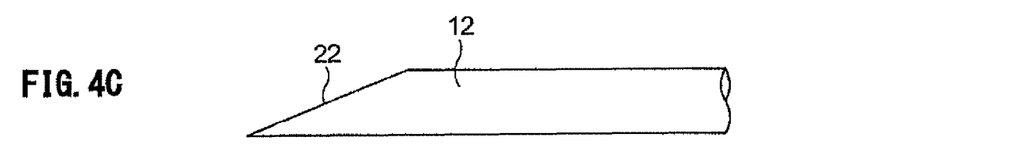
FIG. 4C is a side view.
Figure 5:
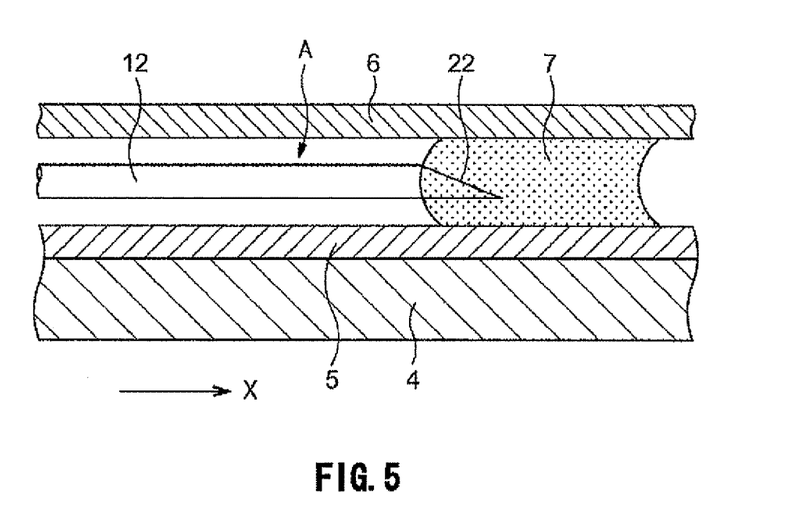
FIG. 5 is a sectional view showing the dispenser nozzle during discharge of a transparent resin.

The dispensing nozzle 12 might also be arranged as shown in FIG. 4A and FIG. 4C in that the discharge outlet 22 faces vertically upward by cutting an upper surface of its tip end to be oblique. With this arrangement, upon start of discharge of the transparent resin 7, the dispensing nozzle 12 first adheres the transparent resin 7 onto the cover glass 6 that is located upward and then to the lower polarizing plate 5 through gravity. The dispensing nozzle 12 then moves through the clearance between the polarizing plate 5 and the cover glass 6 while discharging the transparent resin 7 and applies the resin in a condition in which the transparent resin 7 is constantly adhering to both of the surfaces of the polarizing plate 5 and the cover glass 6 as shown in FIG. 5.

In this manner, the bonding device 1 directs the discharge outlet 22 of the dispensing nozzle 12 upward while it applies the transparent resin 7 such that it continuously adheres to both of the surfaces of the polarizing plate 5 and the cover glass 6 so as to prevent air bubbles from remaining in the transparent resin 7.

<Approximate Position/Curve Top Portion>

Such a dispensing nozzle 12 is inserted by the nozzle moving mechanism 15 into a range between the curve top portion of the cover glass 6 that is held by the cover glass supporting portion 11 and the polarizing plate 5. This position is the most approximate position A at which the polarizing plate 5 and the cover glass 6 are most approximate, and the transparent resin 7 is injected into this position A.

Figure 7A:
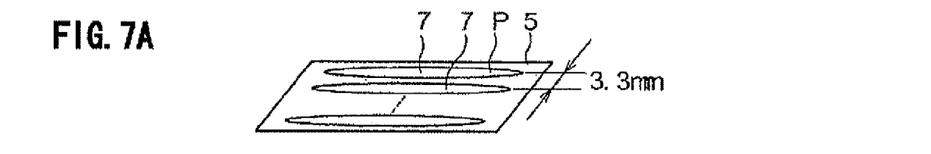
FIG. 7A shows a step of drawing a transparent resin pattern on an adhesive surface of the polarizing plate at which it is adhered to the cover glass.
Figure 7B:
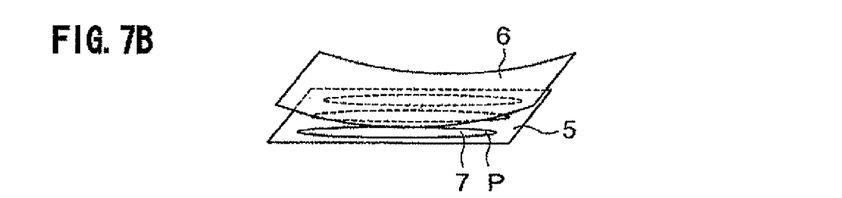
FIG. 7B shows a step of holding the cover glass such that a specified clearance is formed between its curve top portion and the polarizing plate, FIG. 7C show s a step of drawing a proximate pattern at which the transparent resin adheres over both of the surfaces of the polarizing plate and the cover glass.
Figure 7C:
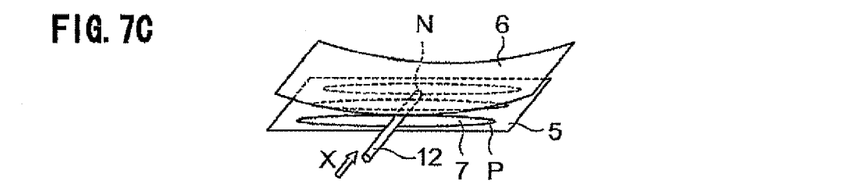

When the dispensing nozzle 12 is inserted into the most approximate position A of the polarizing plate 5 and the cover glass 6 from the side as shown in FIG. 7C, the nozzle discharges the transparent resin 7 while moving back from one end side in the width direction towards the inserting end side (direction against arrow X). With this arrangement, the dispensing nozzle 12 can discharge the transparent resin 7 while adhering the resin to both of the surfaces of the polarizing plate 5 and the cover glass 6 at the most approximate position A.

In this respect, the nozzle moving mechanism 15 moves the dispensing nozzle 12 and the pressurizing means 21 in parallel to the polarizing plate 5 mounted on the mounting portion 10 upon receiving control signals from the control portion 20 and is comprised with, for instance, a mutually crossing rail mechanism. The nozzle moving mechanism 15 holds the dispensing nozzle 12 in a width direction of the polarizing plate 5 as shown by arrow X in FIG. 3 and is freely movable back and forth in the direction of arrow X and against the direction of arrow X. The nozzle moving mechanism is also movable in a longitudinal direction of the polarizing plate 5 (a direction orthogonal to the direction of arrow X in FIG. 3 and a direction parallel to the polarizing plate 5) and it is also capable of positioning the dispensing nozzle 12 at the most approximate position A.

The pressurizing means 21 for supplying the transparent resin 7 stores therein the adhesive 7 that is discharged from the dispensing nozzle 12. The pressurizing means 21 is further connected to a pressing mechanism 16 for making the stored transparent resin 7 be discharged by the dispensing nozzle 12, and control of discharge and discharge termination of the transparent resin 7 and control of discharge pressure is performed. As for the pressing mechanism 16, it is, for instance, possible to use a compression dry air cylinder wherein control of supply and termination of supply of gas into the pressurizing means 21 as well as of supply pressure is performed by the control portion 20, and by supplying gas into the pressurizing means 21 at a specified pressure, the transparent resin 7 is discharged from the dispensing nozzle 12.

<Laminating Rollers>

The laminating rollers 13 are for fitting and spreading the transparent resin 7 between the polarizing plate 5 and the cover glass 6 into which the transparent resin 7 has been injected through the dispensing nozzle 12. The laminating rollers 13 have a columnar shape and are arranged to be elevating above the cover glass 6 and to be rolling in a longitudinal direction of the cover glass 6 by being supported by the roller driving mechanism 18.

The laminating rollers 13 are supported by the roller driving mechanism 18 such that their longitudinal direction is parallel to the most approximate position A of the polarizing plate 5 and the cover glass 6 while they are descended to the most approximate position A and are rolled from the most approximate position A in the longitudinal direction of the polarizing plate 5 and the cover glass 6. With this arrangement, the laminating rollers 13 fit and spread the transparent resin 7 over the rolling direction so as to fill the resin over the entire range between the polarizing plate 5 and the cover glass 6.

The laminating rollers 13 are comprised of a first roller 13*a* that rolls from the most approximate position A of the polarizing plate 5 and the cover glass 6 towards one side in the longitudinal direction and a second roller 13*b* that rolls from the most approximate position A of the polarizing plate 5 and the cover glass 6 towards the other side in the longitudinal direction. The roller driving mechanism 18 descends the first roller 13*a* to the most approximate position A to make the roller roll towards one side in the longitudinal direction and descends the second roller 13*b* to the most approximate position A to make the roller roll towards the other side in the longitudinal direction. With this arrangement, the first and second rollers 13*a*, 13*b* can fill the transparent resin 7 over the entire range between the polarizing plate 5 and the cover glass 6.

In accordance with the rolling of the laminating rollers 13 by the roller driving mechanism 18, the above-described elevating mechanism 17 descends the cover glass supporting portion 11 and descends the outer peripheral edge portions of the cover glass 6 to the polarizing plate 5 side. With this arrangement, the cover glass 6 that had been supported in a warped manner is gradually flattened towards the one or the other end in the longitudinal direction from the most approximate position A to become parallel to the polarizing plate 5 so that it does not receive the load caused through the rolling of the laminating rollers 13. Further, since the cover glass 6 is supported to keep a specified clearance with respect to the polarizing plate 5 in accordance with the rolling of the laminating rollers 13, it is possible to exhaust air in the clearance with the polarizing plate 5 to the exterior through adhesion of the fitting and spreading transparent resin 7 and no air bubbles will remain in the clearance with the polarizing plate 5.

<Manufacturing Step of the Plate-Shaped Bonded Body 2>

Next, steps of manufacturing a plate-shaped bonded body 2 in which the polarizing plate 5 and the cover glass 6 are bonded using such a bonding device 1 will be explained while referring to FIG. 6 and FIG. 7. In the present embodiment, explanations will be made as one example about manufacturing the above-described plate-shaped bonded body 2 in which a cover glass 6 made of a tempered glass plate having a diagonal dimension of 50 inches and a thickness of 0.7 mm is bonded onto a rectangular polarizing plate 5 having a length of 900 mm, a width of 500 mm and a diagonal dimension of 40 inches that is provided on a display surface of a liquid crystal display panel using a transparent resin 7 having a refractive index equivalent to that of the cover glass 6.

First, the polarizing plate 5 is mounted onto the mounting portion 10. At this time, the polarizing plate 5 is held by means of vacuum holding or the like after positioning on the mounting portion 10, and its adhesive surface at which it is adhered to the cover glass 6 is made to face vertically upward.

Figure 6A:
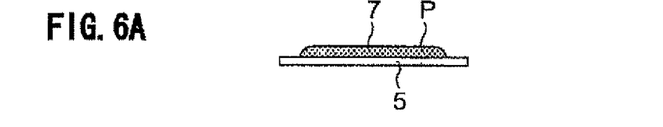
FIG. 6A shows a step of drawing a transparent resin pattern on an adhesive surface of the polarizing plate at which it is adhered to the cover glass.

Then, as shown in FIG. 6A and FIG. 7A, a pattern P is drawn onto the polarizing plate 5 onto its adhesive surface at which it is adhered to the cover glass 6 by applying the transparent resin 7 thereon. While it is preferable that the transparent resin 7 is the same resin as the transparent resin 7 that is injected by the dispensing nozzle 12 in a later step, it might also be a transparent adhesive having the same refractive index as that of the transparent resin 7, an equivalent viscosity (3500 mPa·s) and hardly different physical properties. In the application step of the transparent resin 7, a pattern is drawn by the rolling of the laminating rollers 13 in which the transparent resin 7 is fit and spread over the entire surfaces of the polarizing plate 5 and the cover glass 6 without mixing air bubbles therein. For instance, in the present embodiment, a pattern P that is comprised of a plurality of lines extending in longitudinal directions at specified intervals in the width direction of the polarizing plate 5 is drawn as shown in FIG. 7A. The amount of application of the transparent resin 7 is adjusted with regards to the thickness of the resin layer after curing. For instance, in the pattern P, there are drawn 13 lines at intervals between respective line centers being 33 mm and such that the amount of application of the transparent resin 7 is 14 g, and the thickness of the resin layer after curing becomes 400 µm. In this respect, the drawing step of the pattern P might also be performed using the dispensing nozzle 12 and it is also possible to employ other means.

The cover glass 6 is supported by the cover glass supporting portion 11. At this time, the cover glass supporting portion 11 is elevated by the elevating mechanism 17 to be above the mounting portion 10. The cover glass supporting portion 11 holds the outer peripheral edges on both sides of the cover glass 6 in the longitudinal direction by about 20 mm by means of suction from above or other means. With this arrangement, the cover glass 6 is made to warp by its own weight at its central portion in the longitudinal direction over its width direction towards the polarizing plate 5 side. At this time, a height of an end portion of the cover glass 6 to its curve top portion will be approximately 100 mm as shown in FIG. 2.

Figure 6B:
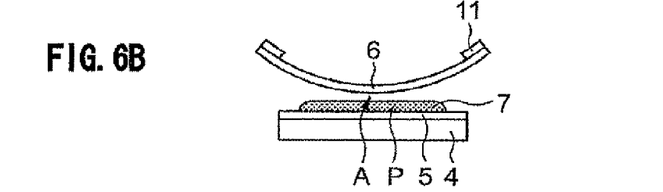
FIG. 6B shows a step of holding the cover glass such that a specified clearance is formed between its curve top portion and the polarizing plate, FIG. 6C show s a step of drawing a proximate pattern at which the transparent resin adheres over both of the surfaces of the polarizing plate and the cover glass.

While maintaining this condition, the elevating mechanism 17 descends the cover glass supporting portion 11 as shown in FIG. 6B and FIG. 7B to hold the cover glass 6 at a height at which the clearance between the curve top portion and the polarizing plate 5 becomes a specified distance (5.5 mm). Then, this position at which the curve top portion of the cover glass 6 and the polarizing plate face each other will be the most approximate position A at which the dispensing nozzle 12 is inserted and at which the laminating rollers 13 descend.

Figure 6C:
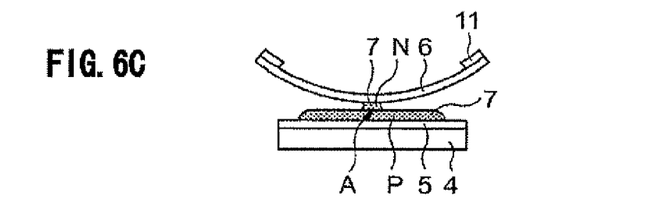

Next, the nozzle moving mechanism 15 inserts the dispensing nozzle 12 into the most approximate position A from the side of the polarizing plate 5 and the cover glass 6 and while moving the nozzle back from the one end side in the width direction to the inserting end side (against direction of arrow X), the pressing mechanism 16 makes the transparent resin 7 within the pressurizing means 21 be discharged through the dispensing nozzle 12. As shown in FIG. 6C and FIG. 7C, the dispensing nozzle 12 draws an approximate pattern N at which the transparent resin 7 adheres over both of the surfaces of the polarizing plate 5 and the cover glass 6 with the nozzle discharging the transparent resin 7 while moving back against the direction of arrow X in FIG. 5 and FIG. 7C along the most approximate position A at which the curve top portion of the cover glass 6 and the polarizing plate 5 are held at a specified clearance. Since the approximate pattern N is drawn along the most approximate position A over the width direction of the polarizing plate 5 and the cover glass 6 so that it crosses the pattern P that has been preliminarily drawn onto the polarizing plate 5. In this respect, the amount of application of the transparent resin 7 for the approximate pattern N is set to be, for instance, 15 g.

Upon completion of injection of the transparent resin 7 at the most approximate position A, the nozzle moving mechanism 15 moves the dispensing nozzle 12 back from between the polarizing plate 5 and the cover glass 6. Next, the elevating mechanism 17 descends the cover glass supporting portion 11, approximates the cover glass 6 to the polarizing plate 5 and presses the transparent resin 7 whereas the roller driving mechanism 18 descends the laminating rollers 13 to be on the most approximate position A of the cover glass 6.

Figure 6D:
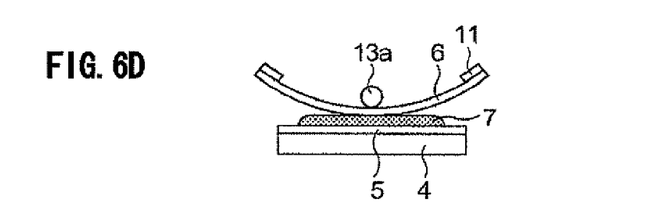
FIG. 6D shows a step of descending a first roller on a most approximate position of the cover glass.
Figure 7D:
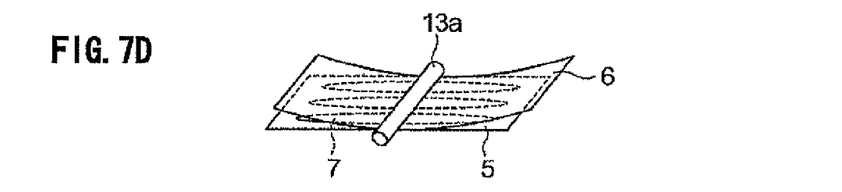
FIG. 7D shows a step of descending a first roller on a most approximate position of the cover glass.

The roller driving mechanism 18 first descends, as shown in FIG. 6D and FIG. 7D, the first roller 13*a* to be on the most approximate position A of the cover glass 6 and makes it roll towards the one end side in the longitudinal direction of the cover glass 6. With this arrangement, the transparent resin 7 that had been preliminarily applied on the polarizing plate 5 in form of lines and the transparent resin 7 that has been injected by the dispensing nozzle 12 along the most approximate position A will become uniform in accordance with the rolling of the first roller 13a towards the one end side in the longitudinal direction between the polarizing plate 5 and the cover glass 6 to be fit and spread.

At this time, the elevating mechanism 17 operates the cover glass supporting portion 11 in accordance with the rolling of the first roller 13a such that the one end side of the cover glass 6 in the longitudinal direction descends. Accordingly, the cover glass 6 will become flat at its one end side in the longitudinal direction to be parallel to the polarizing plate 5 such that no load is applied by the first roller 13a.

More particularly, since the transparent resin 7 that is inserted into the most approximate position A and adhered to both of the surfaces of the polarizing plate 5 and the cover glass 6 fits and spreads uniformly with the transparent resin 7 that had been preliminarily applied on the polarizing plate 5 accompanying the rolling of the first roller 13a and since the cover glass 6 is made to be parallel to the polarizing plate 5 in accordance with the first roller 13a, the transparent resin 7 is fit and spread without air mixing into the clearance with the cover glass and the polarizing plate 5.

Moreover, since the transparent resin 7 is applied in form of lines at specified intervals in the longitudinal direction of the polarizing plate 5 and the cover glass 6, an escape path of air is secured along the rolling direction of the first roller 13a and since the transparent resin 7 is fit and spread accompanying the rolling of the first roller 13a, air will not be surrounded by the transparent resin 7 but exhausted from between the polarizing plate 5 and the cover glass 6.

Further, since the transparent resin 7 is fit and spread accompanying the rolling of the first roller 13a, the resin is filled at a uniform thickness over the entire surfaces between the polarizing plate 5 and the cover glass 6. More particularly, the first roller 13a is made to roll at a constant height on the cover glass 6 by means of the roller driving mechanism 18 while the cover glass 6 is made to be parallel to the polarizing plate 5 by means of the elevating mechanism 17 so that the thickness between the polarizing plate 5 and the cover glass 6 can be made uniform over the entire surfaces.

Figure 6E:
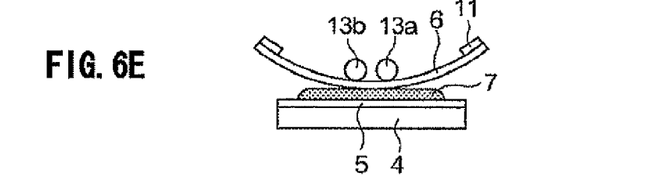
FIG. 6E shows a step of descending a second roller on the most approximate position of the cover glass.
Figure 7E:
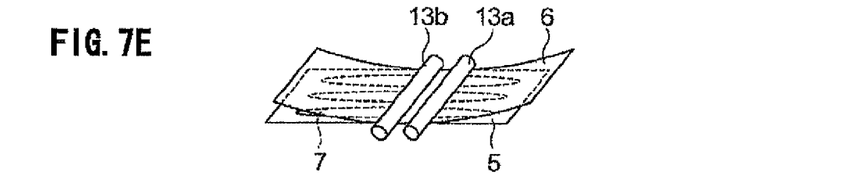
FIG. 7E shows a step of descending a second roller on the most approximate position of the cover glass.

As shown in FIG. 6E and FIG. 7E, following the rolling of the first roller 13a, the roller driving mechanism 18 descends the second roller 13b to be on the most approximate position A of the cover glass 6 for rolling the roller towards the other end side in the longitudinal direction of the cover glass 6. With this arrangement, the transparent resin 7 that had been preliminarily applied onto the polarizing plate 5 in form of lines and the transparent resin 7 that is injected into the most approximate position A by the dispensing nozzle 12 are fit and spread between the polarizing plate 5 and the cover glass 6 towards the other end side in the longitudinal direction in accordance with the rolling of the second roller 13b.

At this time, the elevating mechanism 17 operates, similarly to the case with the first roller 13a, the cover glass supporting portion 11 such that the other end side in the longitudinal direction of the cover glass 6 descends in accordance with the rolling of the second roller 13b. With this arrangement, the transparent resin 7 is fit and spread at a uniform thickness without air mixing to the other end side in the longitudinal direction of the cover glass 6 accompanying the rolling of the second roller 13b.

Figure 6F:
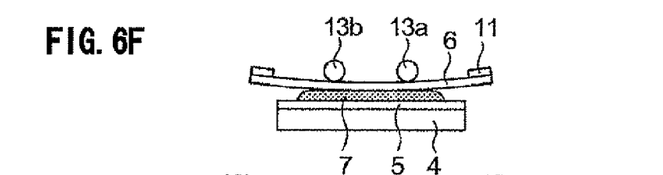
FIG. 6F shows a step of rolling the first and second rollers and filling the transparent resin over the entire range between the polarizing plate and the cover glass.
Figure 6G:
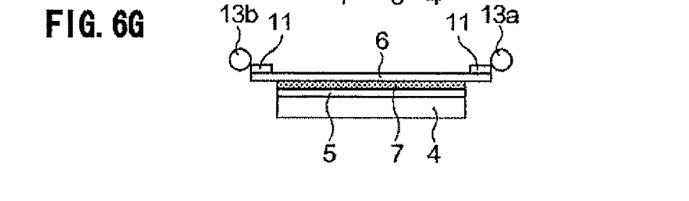
FIG. 6G shows a condition in which filling of the transparent resin over the entire range between the polarizing plate and the cover glass is completed.
Figure 7F:
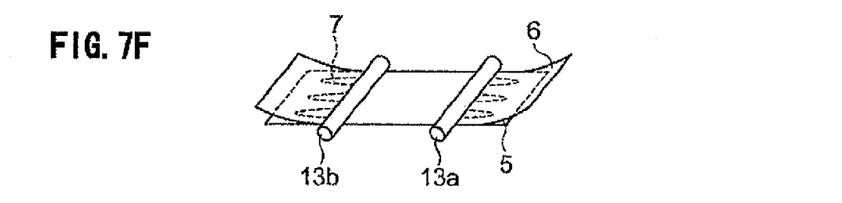
FIG. 7F shows a step of rolling the first and second rollers and filling the transparent resin over the entire range between the polarizing plate and the cover glass.
Figure 7G:
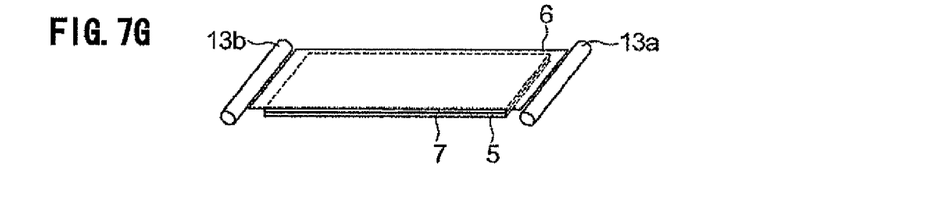
FIG. 7G shows a condition in which filling of the transparent resin over the entire range between the polarizing plate and the cover glass is completed.

As shown in FIG. 6F and FIG. 7F, descending and rolling of the first and second rollers 13a, 13b is continuously performed, and as shown in FIG. 6G and FIG. 7G, filling of the transparent resin 7 over the entire range between the polarizing plate 5 and the cover glass 6 is completed almost simultaneously. Thereafter, ultraviolet rays are irradiated onto the transparent resin 7 filled between the polarizing plate 5 and the cover glass 6 for curing and accordingly manufacturing the plate-shaped bonded body 2.

According to such a method of manufacturing a plate-shaped bonded body 2, the transparent resin 7 is adhered to both of the surfaces of the polarizing plate 5 and the cover glass 6 by injecting the transparent resin 7 into the most approximate position A of the polarizing plate 5 and the cover glass 6, and the transparent resin 7 is fit and spread from this position by means of the laminating rollers 13. At this time, according to the present method of manufacturing, since an end portion of the cover glass 6 is descended to the polarizing plate 5 side in accordance with the rolling of the laminating rollers 13, no air bubbles will be mixed into the transparent resin 7 and since the transparent resin 7 is fit and spread in accordance with the rolling of the laminating rollers 13, it is possible to perform filling over the entire surfaces in a short time even if the size of the polarizing plate 5 and the cover glass 6 is increased.

<Other Structures>

In this respect, while the cover glass 6 has been set such that both ends thereof are held by the cover glass supporting portion 11 in an even manner while its central portion becomes lowest in the above manufacturing step, it is also possible that injection of the transparent resin 7 by the dispensing nozzle 12 and descending of the laminating rollers 13 is performed by providing a curve top portion in a region other than the central portion by differing heights for holding both ends of the cover glass 6 and setting a clearance between the curve top portion and the polarizing plate 5 as the most proximate position A.

In the above manufacturing step, while the pattern P is preliminarily drawn onto the polarizing plate 5 and the approximate pattern N is drawn at the most approximate position A by the dispensing nozzle 12 after descending the cover glass 6, it is also possible to draw the pattern P and the approximate pattern N by the dispensing nozzle 12 after descending the cover glass 6 without preliminarily drawing the pattern P onto the polarizing plate 5.

In the above manufacturing step, while both ends of the cover glass 6 are held by the cover glass supporting portion 11 to bend the cover glass towards the polarizing plate 5 side through warping by its own weight, it is possible to further warp the cover glass when compared to warpage by its own weight or to decrease the amount of warpage when compared to warpage by its own weight by taking measures other than bending through its own weight such as adjusting the holding clearance of both ends of the cover glass 6 through the cover glass supporting portion 11 provided that the clearance between the curve top portion and the polarizing plate 5 can be adjusted.

In the above manufacturing step, while ultraviolet rays are irradiated after filling the transparent resin 7 over the entire surfaces of the polarizing plate 5 and the cover glass 6, it is also possible to irradiate ultraviolet rays during rolling of the laminating rollers 13 provided that the transparent resin is filled over the entire surfaces of the polarizing plate 5 and the cover glass 6 without mixing air bubbles therein and the thickness is controlled to be uniform.

In the present invention, while the first roller 13a and the second roller 13b are used as the laminating rollers 13 that are mutually rolled in opposite directions from the most approximate position A, other arrangements are also possible in which, for instance, one laminating rollers is rotated from the most approximate position A towards one end side of the cover glass 6 whereupon the rolling direction is inversed so as to roll the roller towards the other end side of the cover glass 6 for fitting and spreading the transparent resin 7 over the entire surfaces of the polarizing plate 5 and the cover glass 6.

In the present invention, it is also possible to employ three or more laminating rollers 13 in accordance with the shape or size of the plate-shaped bonded body 2. In the present invention, it is possible to drive the laminating rollers 13 to reciprocate between the most approximate position A and the one end or the other end of the cover glass 6 if required. Moreover, in the present invention, it is possible to make a plurality of rollers roll from the most approximate position A to the one end or other end of the cover glass 6.

In the present invention, it is further possible to make a pressing means other than the rollers wing or move from the most approximate position A to the one end or the other end on the cover glass 6 as long as the liquid filler can be fit and spread between a pair of substrates that constitute the plate-shaped bonded body 2 in a short time without mixing air bubbles therein.

REFERENCE SIGNS LIST

1 . . . bonding device, 2 . . . plate-shaped bonded body, 5 . . . polarizing plate, 6 . . . cover glass, 7 . . . transparent resin, 10 . . . mounting portion, 11 . . . cover glass supporting portion, 12 . . . dispensing nozzle, 13 . . . laminating rollers, 13*a* . . . first roller, 13*b* . . . second roller, 15 . . . nozzle moving mechanism, 16 . . . pressing mechanism, 17 . . . elevating mechanism, 18 . . . roller driving mechanism, 20 . . . control portion, 21 . . . pressurizing means, 22 . . . discharge outlet

The invention claimed is:

1. A method of manufacturing a plate-shaped bonded body, comprising:
    a holding step in which respective adhesive surfaces of a first substrate and a second substrate are made to face each other and in which the adhesive surface of the second substrate is held above the first substrate while the adhesive surface of the second substrate warps towards the first substrate;
    a discharging step in which, while the second substrate is warped towards the first substrate, a dispensing nozzle is inserted from an inserting end side of the first and second substrates into a most approximate position of the first substrate and a curve top portion of the second substrate and in which a liquid filler is discharged from the dispensing nozzle while moving the nozzle back along the most approximate position from one end side hi the width direction of the first and second substrates to the inserting end side to adhere the liquid filler to the first substrate and the second substrate along the most approximate position for at least most of the width of the first and second substrates; and
    a filling step in which pressing members are disposed on the second substrate at a position corresponding to the most approximate position and in which the liquid filler is fit and spread between the first and second substrates by making the pressing members move on the second substrate,
    wherein the second substrate is held in parallel to the first substrate in accordance with moving positions of the pressing members.

2. The method of manufacturing a plate-shaped bonded body as claimed in claim 1, wherein the pressing members are laminating rollers that roll on the second substrate.

3. The method of manufacturing a plate-shaped bonded body as claimed in claim 2, wherein the filling step comprises:
    a first filling step in which a first said laminating roller is disposed on the second substrate at the position corresponding to the most approximate position and in which the liquid filler is fit and spread towards one end side in the length direction of the first and second substrates by rolling the first said laminating roller to the one end side in the length direction of the second substrate, and
    a second filling step in which a second said laminating roller is disposed on the second substrate at the position corresponding to the most approximate position following the first said laminating roller and in which the liquid filler is fit and spread towards the other end side in the length direction of the first and second substrates by rolling the second said laminating roller to the other end side in the length direction of the second substrate.

4. The method of manufacturing a plate-shaped bonded body as claimed in claim 1, wherein held end portions of the second substrate are descended towards the first substrate in accordance with movements of the pressing members.

5. The method of manufacturing a plate-shaped bonded body as claimed in claim 1, wherein in the holding step, the second substrate is warped through its own weight by being held at least at a portion of its outer peripheral edge.

6. The method of manufacturing a plate-shaped bonded body as claimed in claim 1, wherein:
    prior to the holding step, the liquid filler is preliminarily applied on the first substrate in the form of lines over the moving direction of the pressing members;
    the discharging step follows the holding step; and
    the liquid filler discharged in the discharging step along the most approximate position crosses the preliminarily applied liquid filler.

7. The method of manufacturing a plate-shaped bonded body as claimed in claim 1, wherein:
    the first substrate is a polarizing plate that comprises a display surface of a liquid crystal display panel,
    the second substrate is a glass plate that protects the display surface of the liquid crystal display panel, and
    the liquid filler is a transparent resin that bonds the polarizing plate and the glass plate.

* * * * *